US008570775B2

(12) United States Patent
Wei et al.

(10) Patent No.: US 8,570,775 B2
(45) Date of Patent: Oct. 29, 2013

(54) CMV REDUCTION UNDER BUS TRANSIENT CONDITION

(75) Inventors: Lixiang Wei, Whitefish Bay, WI (US); Yuan Xiao, Kitchener (CA); Richard Lukaszewski, New Berlin, WI (US); Navid R. Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 434 days.

(21) Appl. No.: 13/029,209

(22) Filed: Feb. 17, 2011

(65) Prior Publication Data

US 2012/0212982 A1    Aug. 23, 2012

(51) Int. Cl.
*H02M 1/12* (2006.01)
*H02H 7/122* (2006.01)
(52) U.S. Cl.
USPC ............................. 363/39; 363/37; 363/56.12

(58) Field of Classification Search
USPC ..................... 363/37, 39–46, 56.12
See application file for complete search history.

(56) References Cited

U.S. PATENT DOCUMENTS

| 5,905,642 | A | 5/1999 | Hammond |
| 7,301,789 | B2 | 11/2007 | Wiseman |
| 7,368,890 | B2* | 5/2008 | Pande et al. ................ 318/812 |
| 7,782,009 | B2 | 8/2010 | Wiseman |
| 7,808,763 | B2 | 10/2010 | Wiseman |
| 7,990,097 | B2* | 8/2011 | Cheng et al. ................ 318/800 |
| 8,223,511 | B2* | 7/2012 | Cheng et al. ................ 363/35 |
| 8,395,874 | B2* | 3/2013 | Yamai et al. ................ 361/111 |
| 2006/0133120 | A1* | 6/2006 | Sato et al. ................ 363/37 |

\* cited by examiner

*Primary Examiner* — Jessica Han
(74) *Attorney, Agent, or Firm* — Fay Sharpe LLP; Alexander Kuszewski; John M. Miller (57) ABSTRACT

Power conversion systems and control techniques are presented in which a bus transient control component bypasses selected phases of a rectifier during a protective mode of operation to reduce common mode voltages or currents.

24 Claims, 10 Drawing Sheets

CMV REDUCTION UNDER BUS TRANSIENT CONDITION

FIELD OF THE INVENTION

The present invention relates generally to electrical power conversion and more particularly to apparatus and methods for reducing common mode voltage stresses for current source converter-based drive systems.

BACKGROUND

Motor drives are electric power conversion systems that convert input power from a line-side source to a different form to provide controlled drive currents to the windings of a load, such as an electric motor. Current source converter (CSC) type drives, for example, typically include a switching rectifier with AC input power being selectively switched to create a DC link current that is fed to an output inverter which creates single or multi-phase AC output current for driving a motor load at a controlled speed and torque. Both the AC to DC and DC to AC portions of the motor drive often use solid state switching components.

One difficulty in transformerless voltage source and current source inverters (VSI/CSI) is common mode output voltage between the motor load and ground, which can lead to increased stress on the motor. Common mode currents and voltages can also stress drive system components, such as internal link chokes or other components. In some instances, the peak common-mode voltage can equal the peak line-to-neutral output voltage during bus transient conditions, which can double the line-to-ground voltage on the motor. Accordingly, there is a need for an improved systems and method for reducing common mode voltage stresses in motor drives, especially during bus transients in the drive system, for example, to prevent component failures or premature degradation.

SUMMARY

Various aspects of the present are now summarized to facilitate a basic understanding, wherein this summary is not an extensive overview, and is intended neither to identify certain elements, nor to delineate the scope thereof. Rather, the primary purpose of this summary is to present some concepts in a simplified form prior to the more detailed description that is presented hereinafter. The present disclosure presents motor drives and operating techniques in which common mode voltage can be reduced during transient conditions to mitigate or prevent damage to the motor drive or driven motor by intelligent selection of a rectifier phase for bypass operation.

In accordance with an aspect of the disclosure, a power conversion system is provided, which includes an active rectifier, an inverter for driving a motor or other load, and a switch control system having a rectifier control and a bus transient control component coupled to the rectifier control. The switching control system provides switching control signals in a first mode for normal operation and in a second mode for protective operation. In normal operation, the rectifier controls the amount of current provided in accordance with a desired value set by the inverter demands. In certain embodiments, the bus transient control is activated in the second mode based on a detected or sensed distortion of steady state condition is present at power conversion system, such as according to at least one feedback signal or value from a feedback circuit. This may be done in some embodiments using a feedback mechanism that signals a change in steady state conditions of the system, such as by an addition of a further drive on the power source bus, a harmonic filter on the bus, a power factor correction capacitor on the bus, other devices being brought on-line, or any condition that causes a change in the steady state electrical condition of the drive.

The bus transient control causes the rectifier control to bypass a selected phase circuit, such as a rectifier phase, during the second mode to regulate the current based at least partially on a selection criterion. In certain embodiments, the phase bypassed is selected at any given time based at least partially on absolute voltage values at the AC input nodes. In certain implementations, for instance, the bypass phase is selected as that for which the associated absolute line-to-neutral voltage value is smallest (e.g., closest to zero). In certain embodiments, the selected phase is that which is not associated with phases having the highest absolute line-to-line voltage value. This selection may change based on the absolute voltages during the operation in the second mode, and the bus transient controller in certain embodiments determines the selected phase so as to bypass each phase in a sequential pattern, where the selected phases, such as in the system's rectifier, are bypassed by shorting switching devices in the selected phase while switching devices of other phases are opened.

In accordance with further aspects of the disclosure, a method is provided for operating a power conversion system. The method involves two operational modes of a power drive. In the first mode, rectifier switching control signals are provided to an active rectifier to convert input power to provide a DC current, such as to an intermediate DC circuit, and the DC current is regulated. The method further includes monitoring for a transient condition, and upon detection of a transient, operating in a second operational mode by bypassing a selected rectifier phase to reduce a common mode voltage between an AC input and the AC output. Certain embodiments include shorting the rectifier phases in a sequential pattern in the second mode. In certain embodiments, moreover, the bypassed rectifier phase is selected based on an absolute voltage value by shorting the selected rectifier phase not associated with AC input nodes having the highest absolute line-to-line voltage. Certain embodiments include bypassing the rectifier phase having a minimum absolute line-to-neutral voltage value. The method in certain embodiments further includes sensing the transient condition of at least one of the rectifier, the intermediate DC circuit, and the inverter, as well as setting the operational mode of the motor drive to the second mode according to the sensed transient condition.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
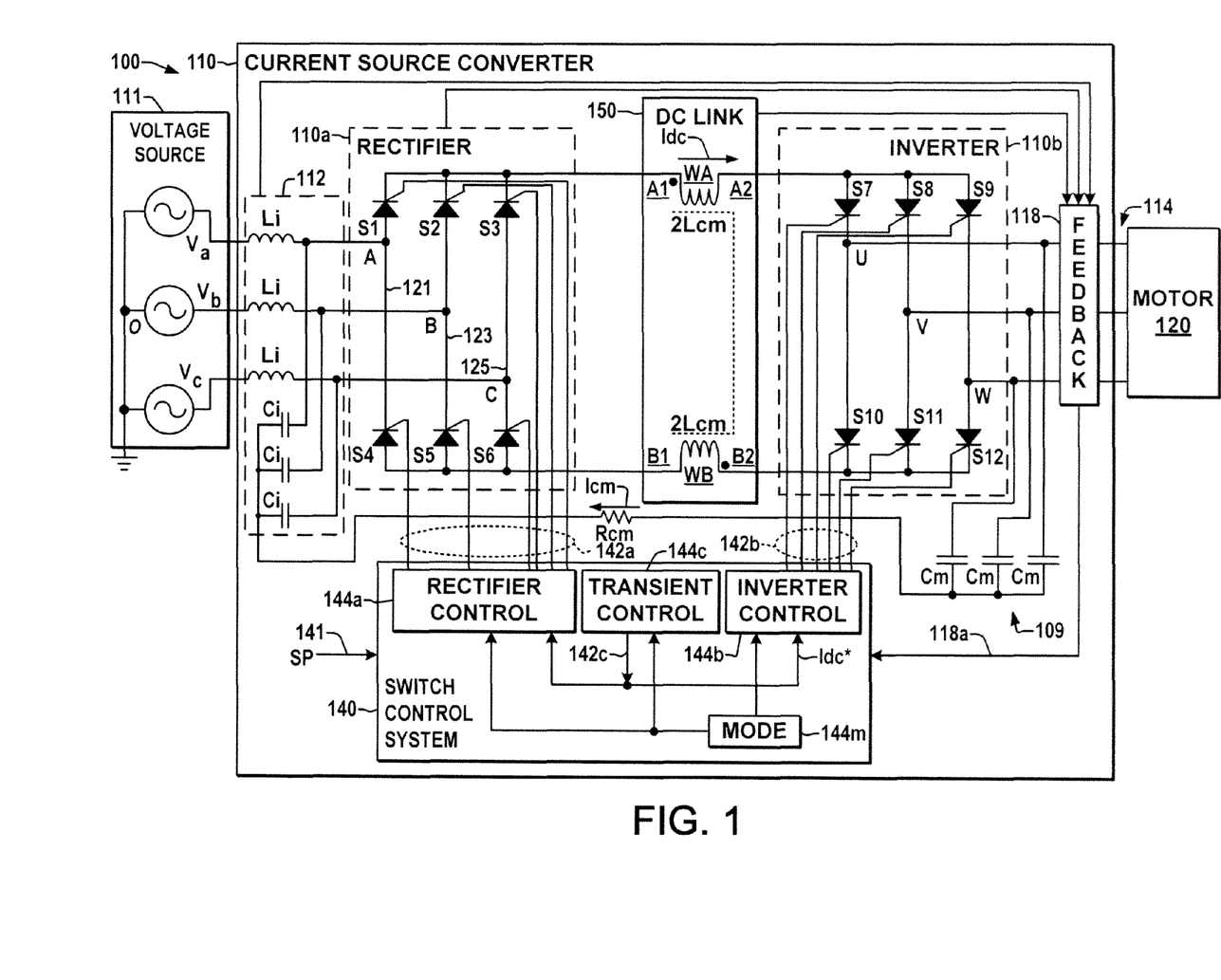
FIG. 1 is a schematic diagram illustrating an exemplary power conversion system with a transient control component in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. A power conversion system 100 is shown in FIG. 1, including an exemplary three-phase AC voltage source 111 providing input power to a motor drive 110 that converts the input power to drive a motor load 120 coupled to a converter output 114. The drive 110 is a current source converter (CSC) type, with an input 112 connected to the AC power source 111. While illustrated as having a three phase input 112, other embodiments may provide a single phase AC input or may include a multiphase input adapted to receive three or more input phases. Other power conversion systems are also envisioned with dual bridge matrix drives, indirect matrix drives or matrix drives that include a matrix of switches that control an AC input power at an AC input node to an AC output node. The CSC drive 110 provides variable frequency, variable amplitude single or multiphase AC output power at output terminals 114 to drive an AC motor load 120, which has three phase windings in the illustrated example. The output 114 in other embodiments may provide a single phase AC output or may be of any number of phases. The motor drive 110 includes an intermediate DC circuit 150 with a DC link choke having upper and lower windings, WA and WB, coupled between an input rectifier 110a and an output inverter 110b comprises switching devices therein. In certain embodiments, the DC link could be a simple DC link inductor or a common mode choke as in the illustrated example.

The illustrated drive 110, moreover, provides input filtering including inductors Li in each input phase and input filter capacitors Ci coupled between the input lines A, B, C, and an input neutral node respectively thereat. The rectifier 110a is a current source rectifier (CSR), for example, that is coupled with the output inverter 110b by the intermediate DC circuit 150, and one or more isolation components (e.g., transformers, not shown) may optionally be included in the drive 110. The output inverter 110b is a current source inverter (CSI), for example, that is adapted to receive the DC output of the DC circuit 150 for generating an AC output at the output 114, which provides output electrical power to the motor load 120 via lines U, V, and W, and includes output capacitors Cm coupled between the load 120 and an output neutral node.

The active rectifier 110a includes a plurality of phases/phase circuits or leg stages that have an arrangement of switching devices S1-S6 coupled between the input 112 and the DC circuit 150 and operates according to a plurality of rectifier switching control signals 142a provided by a rectifier control component 144a of a switch control system 140. The phases include a first phase 121, a second phase 123 and a third phase 125, for example, having switching devices respectively therein. The rectifier 110a is not limited by the number of phase arrangements therein and may include one more phase arrangements that include other switching devices for a current flow. For example, the first, the second and the third phases 121, 123, and 125 have a pair of switching devices respectively that are connected in a series arrangement. In a normal operating mode, the AC input power is switched by the rectifier switches S1-S6 of each phase to create an intermediate DC bus current Idc in the intermediate circuit 150.

The inverter 110b includes switching devices S7-S12 of phases therein coupled with the DC circuit 150 and the output 114, which operate according to corresponding switching control signals 142b. An inverter control component 144b of the switch control system 140 provides the switching control signals 142b to selectively convert DC power from the DC circuit 150 to provide the AC output power to drive the motor load 120.

In a protective mode of operation, one or more phases of the rectifier circuit, for example, are opened while one or more different phases are shorted in order to protect the drive from steady state distortion sensed on the lines of the circuit. A feedback circuit 118, for example, senses transients at the grid input, such as harmonics and background distortion, in the power signals and based on the sensed a transient condition that places the drive in a protection mode/state to prevent damage to any components. The voltage in certain implementations can be measured (e.g., line-to-neutral) at the capacitors Ci at the grid side filter circuit 112 vie the feedback system 118 for line side transient control, where a common cause of the bus transient is grid-side ground faults, PFC capacitor switching, etc. Other sources of transients can include the addition of a further drive on the power source bus, adding a harmonic filter on the bus, a power factor correction capacitor on the bus, or other devices brought on-line or taken off-line. Transient conditions can be the result of any condition that causes fluctuation in the electrical signals in the conductive lines of the motor drive circuit. A transient condition is a change in the steady state condition or normal operating electrical conditions of the lines that occurs during surges in electrical conditions causing a linear, exponential, or uncontrolled chaotic change in amplitude, frequency, power, energy, voltage, current, etc. within conductive paths of the circuit from among normal operating levels. At times the transients could reach twice the line voltage, for example, at which point often results in device failure or premature degradation within the drive without any protection being implemented.

The DC circuit 150 has a DC link choke or inductor that links the switches of the rectifier 110a and the inverter 110b, and provides forward current paths. However, the DC circuit is optional and other configurations are envisions, such as in dual bridge matrix drives, indirect matrix or matrix drives. The first winding WA of the example illustrated in FIG. 1 is a forward or positive DC path of the link choke that has a first end A1 connected to the upper switches S1-S3 and a second end A2 coupled with the upper CSI switches S7-S9, and the second winding WB in a negative or return DC path has a first end B1 coupled to the lower CSR switches S4-S6 and a second end B2 coupled to the lower switches S10-S12. The switching devices S1-S6 and S7-S12 may be any suitable controllable electrical switch types (e.g., IGCTs, GTOs, thyristors, IGBTs, etc.) that are controlled according to any suitable type or form of switching scheme or schemes, such as phase control, pulse width modulation, etc., in open or closed-loop fashion. In certain embodiments, the switching devices S7-S12 of the inverter 110b are forced commutated devices including without limitation SGCTs, IGBTs or GTOs, and the switching devices S1-S6 of the rectifier 110a can be force commutated devices such as those mentioned above as well as line commutated devices such as Thyristors. In this regard, Thyristor devices may be used for the inverter switching devices S7-S12 in the form of forced commutated devices with extra circuitry added to the device triggering circuit thereof.

The motor drive 110 also includes a switch control system 140 that comprises one or more processors and associated memory as well as I/O circuitry (not shown) including driver circuitry for generating switching control signals 142 to selectively actuate the switching devices. Separate switching control systems may also be employed, for example, with interconnections and information sharing to facilitate the coordinate operation of the drive 110. The drive 110 also includes a feedback system 118 operatively coupled with the input 112, the rectifier 110a, the DC circuit 150, the inverter 110b, and the output 114. The feedback system 118 includes one or more sensing elements operative to provide one or more feedback signals and/or values 118a indicative of electrical conditions at the input 112, the rectifier 110a, the intermediate DC circuit 150, the inverter 110b, and/or at the output 114. For example, a change in the steady state condition measured at bus lines connecting the drive 110 can determine a feedback signal and/or value provide to the switch control system 140. The switch control system 140 may be provided with one or more setpoints or desired values 141 and one or more feedback signals or values 118a from the feedback system 118 by which one or more closed loop motor drive control goals are achieved in a protective mode operation for protecting the drive during a transient condition. The switch control system 140 and the components 144 thereof may be any suitable hardware, processor-executed software, firmware, logic, or combinations thereof that are adapted, configured, programmed, or otherwise operative to implement the functions illustrated and described herein.

Feedback signals or values for the control functions can be based on signals and/or values 118a from the feedback system 118, measured input values (e.g., line voltages, currents, etc.), and other information, data, etc., which may be in any suitable form such as an electrical signal, digital data, etc., and which may be received from any suitable source, such as an external network, switches, a user interface associated with the system 100, or other suitable source(s). In the illustrated embodiments, the feedback circuit 118 provides one or more feedback signals or values 118a to the controller 140 based on a sensed condition of at least one of the rectifier 110a, the DC circuit 150, and the inverter 110b, or other circuitry coupled at the AC input and AC output nodes, including measured steady state values through appropriate peak detectors or other sensors, and/or sensed values from which signal transient conditions, frequency, amplitude, current, and/or voltage, etc. may be determined by the controller 140. In this regard, sensorless signal feedback values may be generated internally by the controller 140 via suitable motor models based on the feedback signals or values 118a even for systems having no direct steady state sensors.

In the illustrated examples, the switch control system 140 includes a mode control component 144m operative to set the switch control system 140 to either a first mode for normal operation of the motor drive 110 or to a second mode for situations requiring circuit protection, where the exemplary mode control component 144m sets the motor drive mode according to at least one feedback signal or value 118a from the feedback circuit 118. In particular, the illustrated mode control component 144m sets the switch control system 140 to the second mode when a transient condition is detected or sensed, such as a change in steady state or in any other situation in which it is desirable to reduce the common mode voltages or currents in the drive 110, such as common mode voltages across the input and output of the drive 110 or at the motor 120 using electrical control techniques for selective phase bypassing as described herein. For example, a common mode resistor Rcm between the output neutral node 109 and the input neutral node 111 can experience a common mode voltage that is twice the normal voltage during a transient condition across the drive 110 and this common mode voltage can cause unexpected component failures or premature device degradation. The switch control system 140 in these embodiments includes an inverter control component 144b providing the inverter switching control signals 142b in the first and second modes to cause the inverter 110b to selectively convert DC current from the DC circuit 150 to provide AC electrical power to the AC output 114 according to one or more setpoints 141.

In normal operation (first mode), a rectifier control component 144a of the controller 140 provides the rectifier switching control signals 142a to convert AC electrical input power to provide a regulated DC current Idc to the DC circuit 150 according to a desired DC current value Idc* representing the requirements of the inverter 110b. In doing so, the rectifier controller 144a may employ one or more feedback signals or values 118a, such as a measured DC current value from the rectifier 110a representing the actual DC current Idc. When a measured change in the steady state condition of the drive is sensed at the mode control component 144c, a protective mode or second mode of operation is then signaled. In addition, a change in mode may occur when a signal indicating such change in the steady state condition of the drive is going to occur, such as when a further drive on the power source bus, a harmonic filter on the bus, a power factor correction capacitor on the bus, other devices are brought on-line. Any number of conditions appreciated by one of ordinary skill the art could also generate a steady state condition, which may be sensed or signaled to the mode control component 144m.

In the second mode (drive protection), the bus transient control component 144c is operative to provide at least one bus transient control signal or value 142c to the rectifier control component 144a to cause the rectifier control component 144a to selectively bypass a selected phase of the rectifier 110a. In the illustrated three-phase example, the rectifier includes three rectifier phases 121, 123, and 125 of which one phase is selected for bypassing at any given time in the second mode based at least partially on one or more selection criteria in order to reduce common mode current between the input 112 and the output terminal 114 of the drive 110. During changes in steady state conditions, where rapid spikes can occur in a time varying electrical value, such as power, voltage, current or energy or the like, and these spikes may be advantageously reduced by the transient control 144c that is operative to bypass selected phases of the rectifier 110a in a sequential pattern in certain embodiments. At any given time during the second mode, the first rectifier phase 121 (associated with input phase "A"), the second phase 123 (associated with input phase "B"), or the third phase 125 (associated with input phase "C") may be selectively bypassed by the transient control 144*c* causing the rectifier controller 144*a* to activate (turn ON) both switching devices of the selected rectifier phase based at least partially on the selection criteria. In a matrix drive or the like the switching devices of phases may not represent rectifier phases, phases having switching devices therein connected to an AC input and a corresponding AC output. For example, the switching devices in FIG. 1 of the phase selected (e.g., S1 and S4 of phase 121, or other phases) are selectively shorted by the transient control signals 142*c* (both ON or conductive) while the other phase switches are opened based on a sensed or derived absolute voltage value obtained from the feedback system 118. The devices may be shorted directly by actuation of the switches themselves or via other current pathways (e.g., one or more dedicated bypass switches connected across the phase switches, not shown) that may couple other devices or pathways across the selected phase to allow current flow without substantial impedance across the selected phase.

Figure 3:
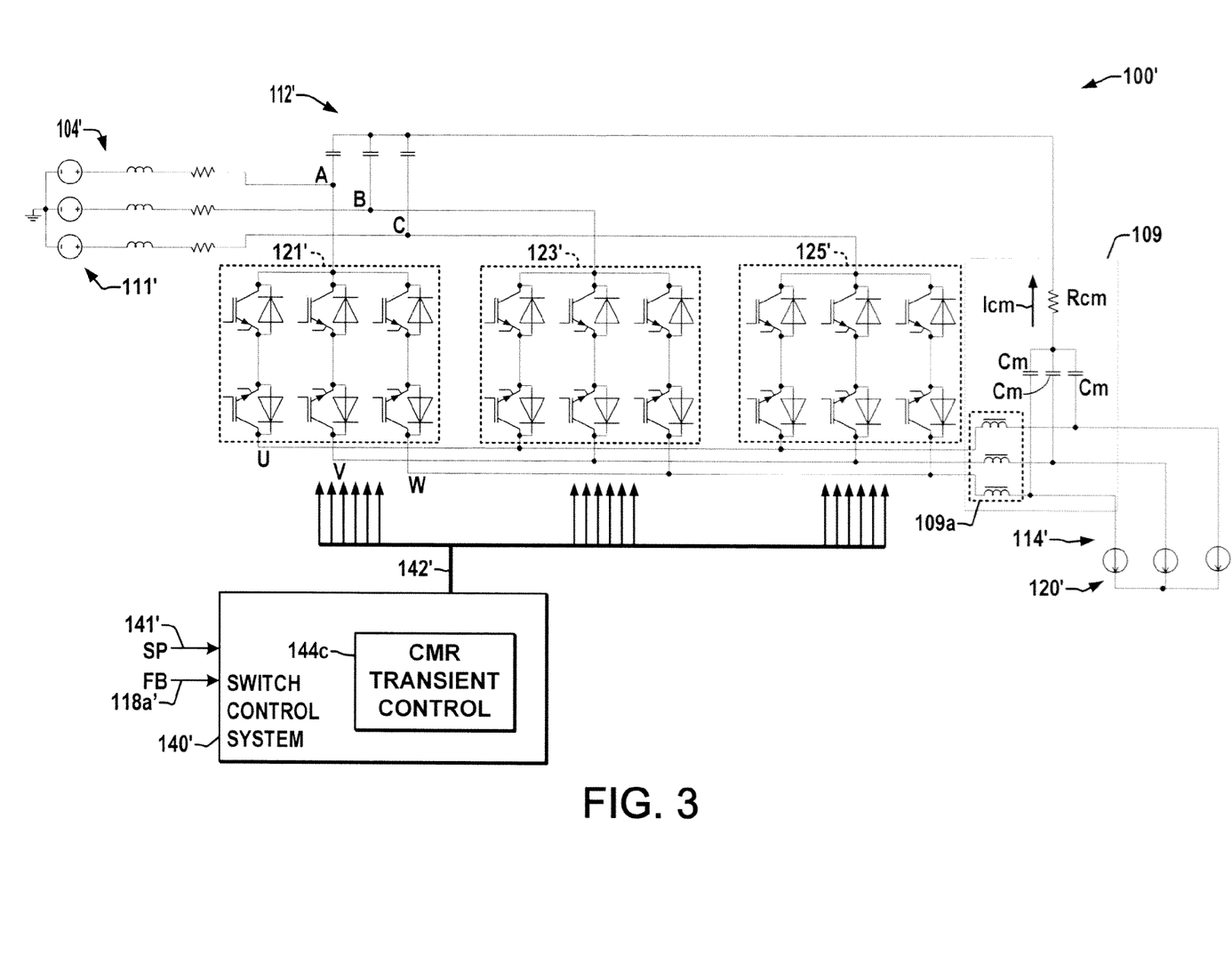
FIG. 3 is a schematic diagram illustrating an exemplary power conversion system with a transient control component in accordance with one or more aspects of the present disclosure.

In certain embodiments in the second mode, the rectifier control component 144*a* provides the rectifier switching control signals 142*a* to short rectifier phases at a given time according to the transient control signals 142*c* based on the selection criteria, while other (non-selected) phases are opened. For example, the phase associated with the lowest absolute line-to neutral voltage value at any given time may be selected for bypassing during the second mode. In another example, one or more pairs of the rectifier switches (e.g., S1/S4, S2/S5, and/or S3/S6) of the rectifier phases may be turned on at different times to provide a circuit path for current flow while other pairs of switches in other phases are opened to prevent current flow, for instance, as the absolute line-to-neutral voltage values change during a transient condition. The transient control component 144*c* generates the bus transient control signals 142*c* at different times to cause different phases of the rectifier to be shorted according to the selection criteria during a sensed change in the steady state condition of the drive 110. For example, while in the second mode of operation the first rectifier phase 121 (associated with input phase "A") may be shorted while the second phase 123 and the third phase 125 are opened during the time for which the associated line-to-neutral voltage (e.g., the absolute value of $V_{ci}a$ in FIG. 3 is lower than the other line-to-neutral voltages $V_{ci}b$ and $V_{ci}c$, indicated as BP Va (bypass phase a) in the graph of FIG. 3). The second phase 123 (associate with input phase "B") may then be shorted (BP Vb when the absolute value of $V_{ci}b$ in FIG. 3 is lower than that of $V_{ci}a$ and $V_{ci}c$) while the first and third phases 121 and 125 are opened. Thereafter as shown in FIG. 3, the third phase 125 (associated with input phase "C") may be shorted (BP Vc) while the first and second phases 121 and 123 are opened (while the absolute value of $V_{ci}c$ in FIG. 3 is lower than $V_{ci}a$ and $V_{ci}b$). Various sequential patterns may be signaled by the transient control 144*c* according to the selection criteria measured during the second mode of operation and according to the duration of a given transient condition, and other patterns for shorting one or more selected phases and for opening other phases during a transient condition may be signaled via the bus transient control component 144*c*.

Several different exemplary embodiments of a transient control component 144*c* are illustrated and described below in connection with the following figures, wherein the component 144*c* may be implemented as hardware, processor-executed software, firmware, logic, or combinations thereof and the transient controller 144*c* may be implemented as a separate component or may be integral with the rectifier control component 144*a* or in other components of the switch control system 140. The transient control component 144*c* in one example provides bus signals 142*c* via a bus line to the rectifier controller 144*a* in order to cause bypassing of the selected rectifier 121, 122, or 123 at any given time. The control signals 142*c* in certain embodiments initiate bypassing of the phases in a sequential pattern with respect to time, in which the selected phase for bypassing may vary according to different parameters of the circuit. In certain embodiments, moreover, rectifier phases are bypassed in the second mode according to various mechanisms and selection criteria. For example, a phase of the rectifier having switching devices may be shorted with any suitable controllable electrical switch types (e.g., IGCTs, GTOs, thyristors, IGBTs, etc.) that are otherwise controlled according to any suitable type or form of switching scheme or schemes, such as phase control, pulse width modulation, etc., by the control component 144*c*. In certain embodiments, the rectifier devices within each phase are sequentially and directly shorted at various times during a second protective mode of operation for current to flow with substantially no impedance through a selected phase at any given time in response to the bus transient control signal(s) or value(s) 142*c* provided by the transient controller 144*c*.

Figure 2:
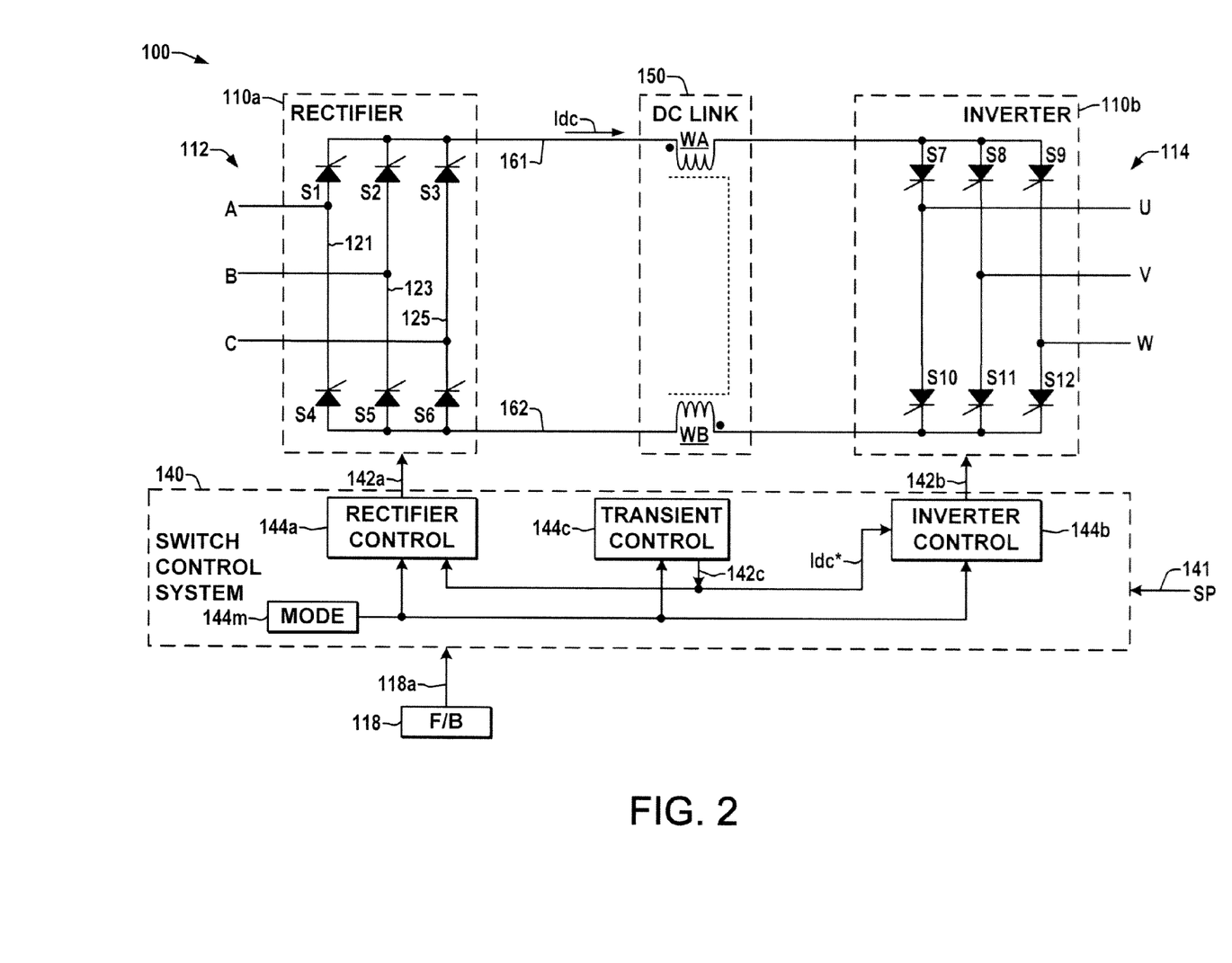
FIG. 2 is a schematic diagram illustrating further details of the system of FIG. 1.

As further shown in FIG. 2, the rectifier circuit 110*a* has upper and lower switching devices S1-S6 electrically coupled within the rectifier phases 121, 123, and 125 respectively. The transient control component 142*c* receives one or more feedback signals and/or values 118*a* from the feedback circuit 118 based on the conditions of the electrical line signals sensed and the mode set by the mode control component 144*m*. Based on one or more selection criteria, the transient control component 142*c* reduces the electrical signal fluctuations across the input and output nodes of AC input lines A, B, C and AC output lines U, V, W, respectively, by selectively bypassing a selected rectifier phase. For example, the transient control component 144*c* provides signals to the rectifier controller 144*a* in order to initiate a sequence operation pattern with respect to time during the transient condition. The transient control component 144*c* signals a selected phase of the rectifier 110*a*, for instance, the first phase 121 to be bypassed by shorting the rectifier devices within the phase 121 (S1 and S4 in this example). The selection of which rectifier phase to short at any given time during the second mode is based at least partially on selection criteria. For example, the lowest absolute line-to-neutral voltage value across each phase of the rectifier may be measured to determine the selected phase to be shorted at any given time. The line-to-neutral voltage may vary across the rectifier phases 121, 123 and 125 at any given time, and thus, to ensure that the line associated with the lowest absolute line-to-neutral input voltage value is always shorted during the transient conditions, the selected phase changes according to the measured line-to-neutral input voltages. In other words, the rectifier phases can each be shorted in a sequence based on selection criteria that includes the lowest absolute line-to-neutral voltage value associated with the phases of the rectifier, which changes with respect to time.

Alternatively, the selection criteria can include other electrical measurements or information provided externally of switched conditions being generated on the input lines. For example, an absolute line-to-line voltage across each respective pair of input lines A, B, and C may be measured (or otherwise determined) and the absolute values of these voltages can be used as the selection criteria. In certain embodiments, a maximum absolute line-to-line voltage value, for example, across any two lines (e.g., VAC, VAB, VBC) may be used as the selection criteria to determine the selected rectifier phase. In this regard, the phase that is no associated with the largest absolute line-to-line voltage value can be selected for bypassing at any given time in certain embodiments. For instance, if the absolute value of the A-B line-to-line voltage (VAB) is the highest of the three absolute line-to-line voltages, the phase not associated with this voltage (i.e., phase "C", 125) is the selected phase for bypassing while the other (non-selected) phases A and B are opened. When transient conditions or electrical fluctuations are sensed on bus lines or input lines A, B, C that vary from a steady state condition or normal operation, the mode controller 144 switches operation to the second (protection) mode of operation in which the transient control 144c determines which rectifier phases to electrically short and/or open. At any given time, the electrical signals in each rectifier phase vary and the rectifier phase that corresponds to the selection criteria used by the transient control 144c becomes the phase that is shorted (bypassed). While the selected phase is shorted, the other phases of the rectifier not selected are opened to reduce common mode voltage of the drive. For example, common mode voltage can be controlled to less than 300 volts in an absolute voltage value in certain exemplary medium voltage drives 110. Without such protection mechanisms, the voltage can spike much more due to the saturation of the common mode choke in the DC link and cause unexpected device failures within the drive. After transients being sensed on the drive are finished, the drive returns via the mode control to the first mode for normal motor drive operation.

FIG. 3 illustrates an exemplary power conversion system 100', such as a matrix drive, with a switching network matrix 162 operated by a switch control system 140' with a common mode reduction transient control component 144c in accordance with further aspects of the disclosure. The system 100' includes a multi-phase AC input 104' with a plurality of AC input terminals for receiving multi-phase AC electrical input power from a source 111', and may include an input filter circuit 112' (capacitors in this example) coupled with the input lines A, B, and C and providing an input neutral coupled to an output neutral via a common mode resistance Rcm. In certain embodiments, the connection from the line-side neutral to the load-side neutral, as well as the common mode sense resistor Rcm can be omitted. Moreover, the system 100' may include output filter circuitry 109, such as output capacitors Cm forming a load-side neutral as shown, as well as line reactors, which can be separate reactor components in the individual output lines, or these can be wound on a common core as a common mode choke 109a as shown. The system 100' also has a multi-phase AC output 114' with a plurality of AC output terminals for providing multi-phase AC electrical output power, for instance, to a load 120' (e.g., motor, grind, etc.). The switching network 162 includes a plurality of switching devices forming a plurality of phase circuits 121', 123', and 125' in the illustrated three-phase example, with each phase circuit associated with one of the input phases (e.g., circuit 121' coupled with input phase A, circuit 123' coupled with phase B and circuit 125' coupled with input phase C). The matrix switching devices are operated according to a corresponding switching control signal from the controller 140, with each phase circuit 121', 123', and 125' being connected to a corresponding AC input terminal A, B, C and to a corresponding AC output terminal U, V, W, where each phase circuit 121', 123', and 125' includes at least one switching device coupled between the corresponding AC input terminal and the corresponding AC output terminal. The switch control system 140' provides switching control signals 142' to cause the switching network 162 to selectively convert the AC electrical input power from the multi-phase AC input 104' to provide the multi-phase AC electrical output power to the a multi-phase AC output 114' based on one or more setpoint signals or values 141'.

The switching control system 140' includes a transient control component 144c that provides transient control signals 142' to cause bypassing of the phase circuits 121', 123', and 125' according to selection criteria in a second (protection) mode, as discussed above in detail. The transient control component 144c provides at least one transient bypass signal 142' to cause the switching network 162 to short a selected phase circuit (e.g., 121') based on at least one selection criteria during operation in the second mode while opening at least one switching device associated with the other phase circuits (e.g., 123', and/or 125'). The transient control component 144c is operative to short the phase circuits 121', 123', and 125' in a sequential pattern so that the selected phase circuit being shorted is changed to another selected phase circuit at different times during operation in the second mode according to the selection criteria. For example, the selected phase circuit is chosen as the phase associated with an AC input node having a minimum absolute line-to-neutral voltage value at any given time during operation in the second mode, which is received as a sensed measurement at a feedback signal 118a'. In other embodiments, the selected phase circuit is chosen as the phase not associated with AC input nodes having the highest absolute line-to-line voltage value at any given time during operation in the second mode.

Figure 4:
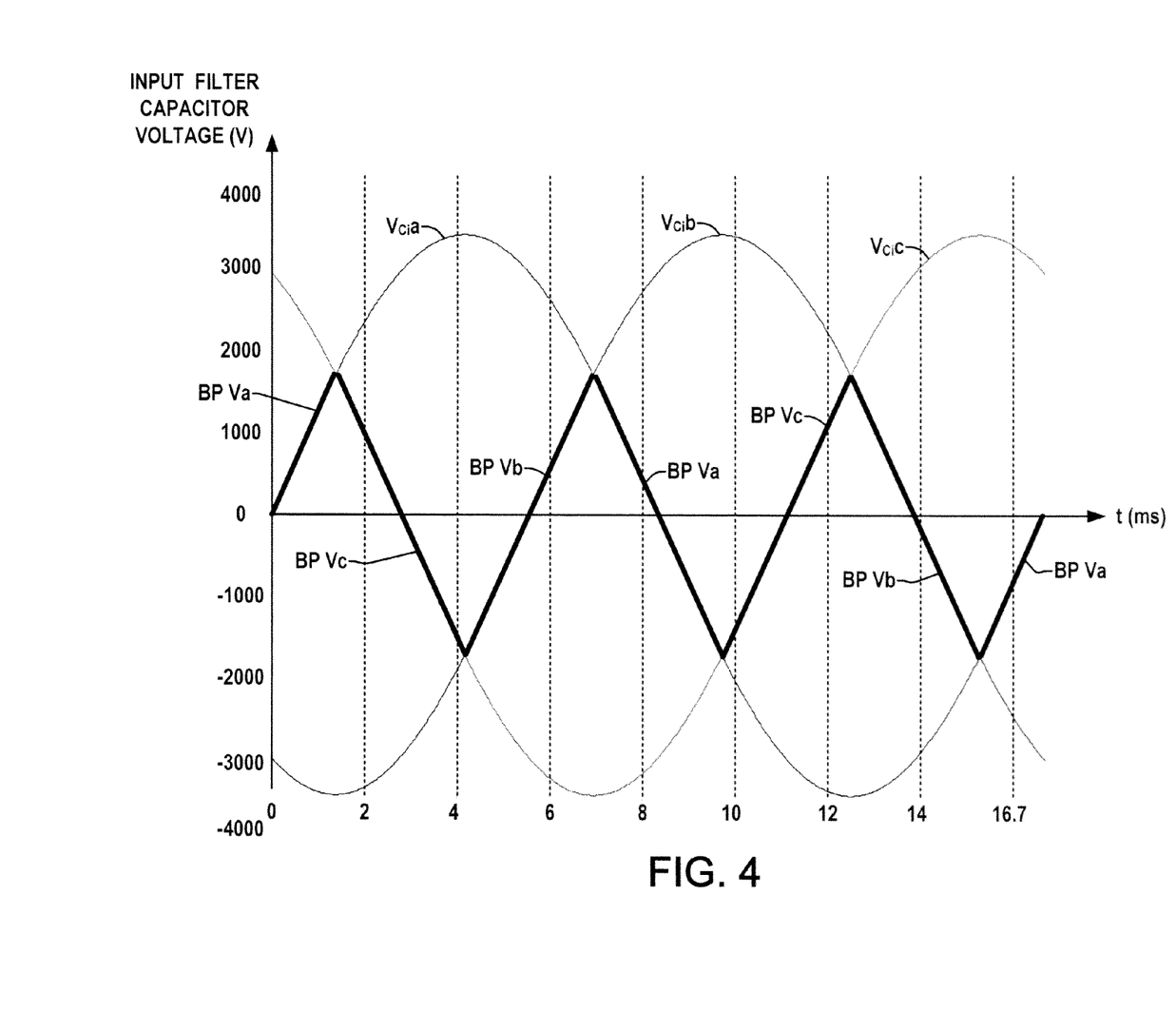
FIG. 4 is a waveform diagram illustrating exemplary input line-to-neutral phase voltages measured at the motor drive and selected rectifier phases that are shorted during transient bus conditions.

An example is shown in FIG. 4 in which line-to-neutral input voltage signals across the input capacitors Ci are illustrated ($V_{ci}a$, $V_{ci}b$, and $V_{ci}c$). Each signal is a time varying signal having an amplitude and frequency that remains substantially constant under steady state conditions of the drive circuit. Transient conditions alter the signals and change the steady state condition of the signal to become rampant discontinuities in waveform slope, curvature, etc., as opposed to being approximately fixed or steady over time. FIG. 4 further illustrates the selected phase at any given time to be shorted based on the phase having the lowest absolute line-to-neutral voltage (closest to zero). At time equal to zero, for example, the phase 121, 121' is associated with the measured line-to-neutral voltage $V_{ci}a$ across the corresponding input capacitor Cia. The bus transient control component 144c, 144c' generates signals 142c, 142c' to the rectifier control 144a to short a phase 121, 121'. As time passes, the phase having $V_{ci}a$ increases in absolute value to a point where the phase 125, 125' having $V_{ci}c$ becomes the selected phase that is signaled by the transient control component 144c, 144c' to be shorted. Subsequently, $V_{ci}b$ is the measured absolute line-to-neutral voltage value and in response phase 123, 123' is the selected phase to be shorted. The signals from the transient control component 144c, 144c' continue until the second mode of operation changes and the transient condition is no longer detected. Alternatively, other selection criteria other than an absolute line-to-neutral voltage value may be used to select a phase at any given time to be bypassed. For example, a maximum line-to-line voltage may be used as the selection criteria to bypass the phase not associated with the highest line-to-line voltage. For example, when Vab is the highest absolute voltage value compared to other line-to-line voltage values, the phase "C" (125, 125') not associated with that voltage is selected for bypassing, while the other phases A and B are opened so that no current passes through them. The present disclosure is not limited to any one selection criteria to sequentially short phases of the drive circuit. The selection criteria to sequentially bypass the phases can be based on any electrical data sensed or provided to the transient control component for determining a different selected phase at different times to reduce common mode voltage and control common mode current in the drive circuit during a transient condition.

Figure 5:
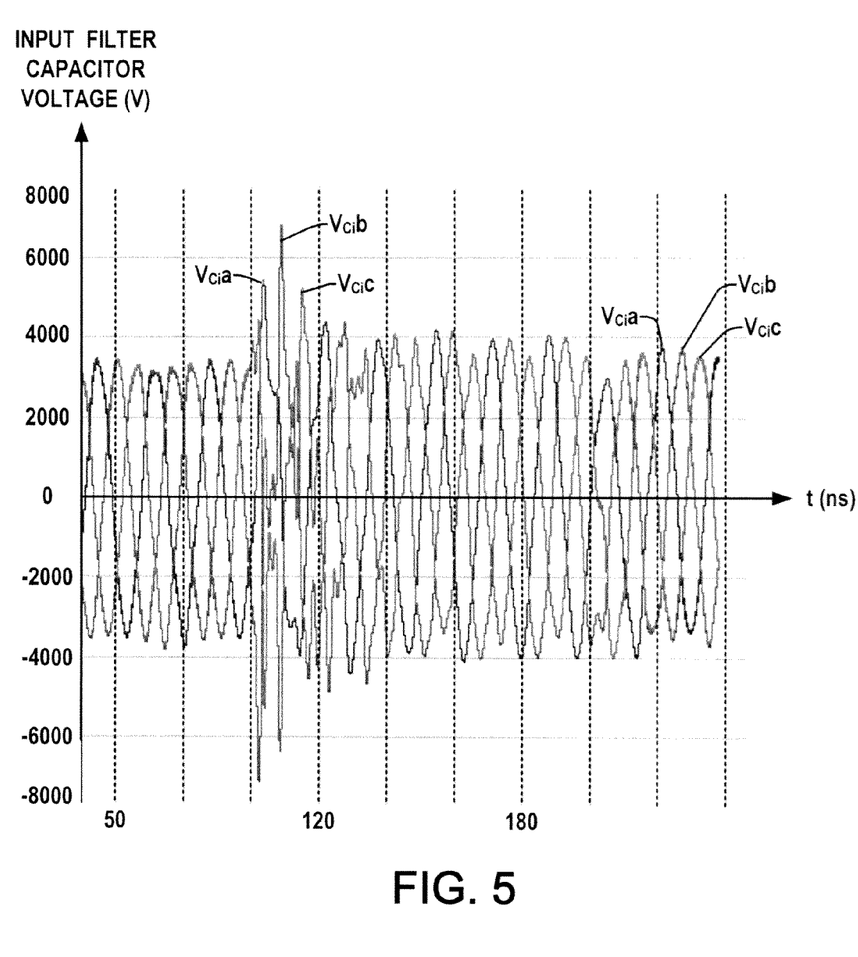
FIG. 5 is a waveform diagram illustrating exemplary input voltage conditions in the motor drive in a normal operating mode and during a transient condition without the selective bypass control of the present disclosure.

FIG. 5 shows exemplary input voltage conditions in the motor drive in a normal operating mode and during a short transient condition without the selective bypass control of the present disclosure. This diagram shows electrical time varying line-to-neutral voltage signals $V_{ci}a$, $V_{ci}b$ and $V_{ci}c$ measured across input capacitors at the input filter 112. Prior to t=120 ms, a transient condition occurs, having a duration of approximately 35 ms. Before and after the transient condition, the signals $V_{ci}a$, $V_{ci}b$ and $V_{ci}c$ are in a steady state condition where the frequency and amplitude of the time varying electrical signals remain relatively constant or steady. Once a transient condition is sensed or made known, the exemplary motor drive 110, for example, operates in the second mode and the bus transient control 144c, 144c' selectively determines a selected phase among the phases to sequentially short while other phases are opened. Protective actions in the second mode provided by the bus transient control component reduces common mode voltage signals to less than 300 V.

Figure 6A:
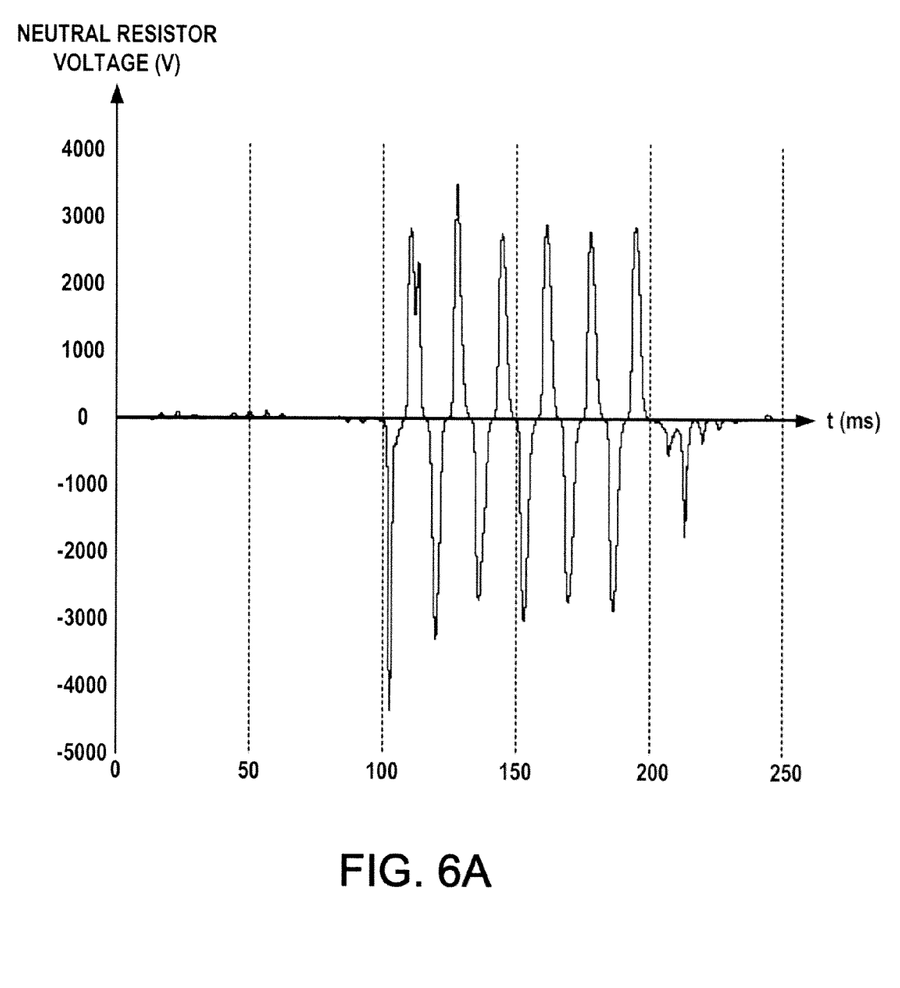
FIG. 6a is a waveform diagram illustrating exemplary neutral resistor voltage in the motor drive in a normal operating mode and during a transient condition without the selective bypass control of the present disclosure.
Figure 6B:
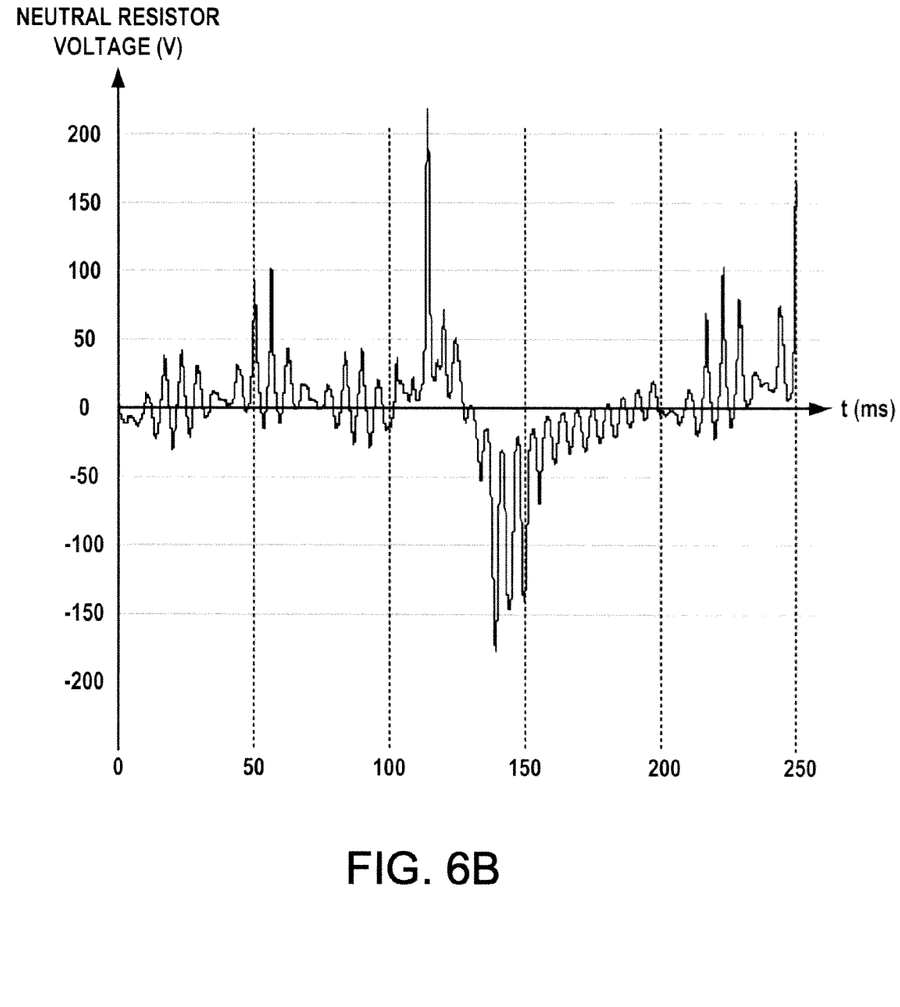
FIG. 6b is a waveform diagram illustrating exemplary neutral resistor voltage in the motor drive in a normal operating mode and in a protective second mode during a transient condition using selective bypass control in accordance with the present disclosure.

FIGS. 6a and 6b show exemplary neutral resistor voltage conditions (e.g., across Rcm in FIGS. 1 thru 3 above) in a normal operating mode and during a transient condition, where FIG. 6a shows operation without the selective bypass control of the present disclosure and FIG. 6b shows the situation where the selective bypassing in the second mode is used to inhibit common mode currents and voltages during a transient condition. For example, FIG. 6a illustrates the voltage across a neutral resistor Rcm coupled between the input filter 112, 112' and the output filter 114, 114' of the drive when there is no protective bypass sequencing (e.g., without the exemplary mode controller 144m and the transient controller 144c, 144c' described above). As seen in FIG. 6a, the common mode current across Rcm generates large swings in voltage level that peak at an absolute value of almost four thousand volts. However, FIG. 6b illustrates a common mode voltage of less than 300 V when the bus transient control operates to signal sequencing of the phases such that no one or more phases are constantly being shorted during a transient condition, but rather all phases are sequentially shorted as a selected phase at any given time based on selection criteria.

Figure 7:
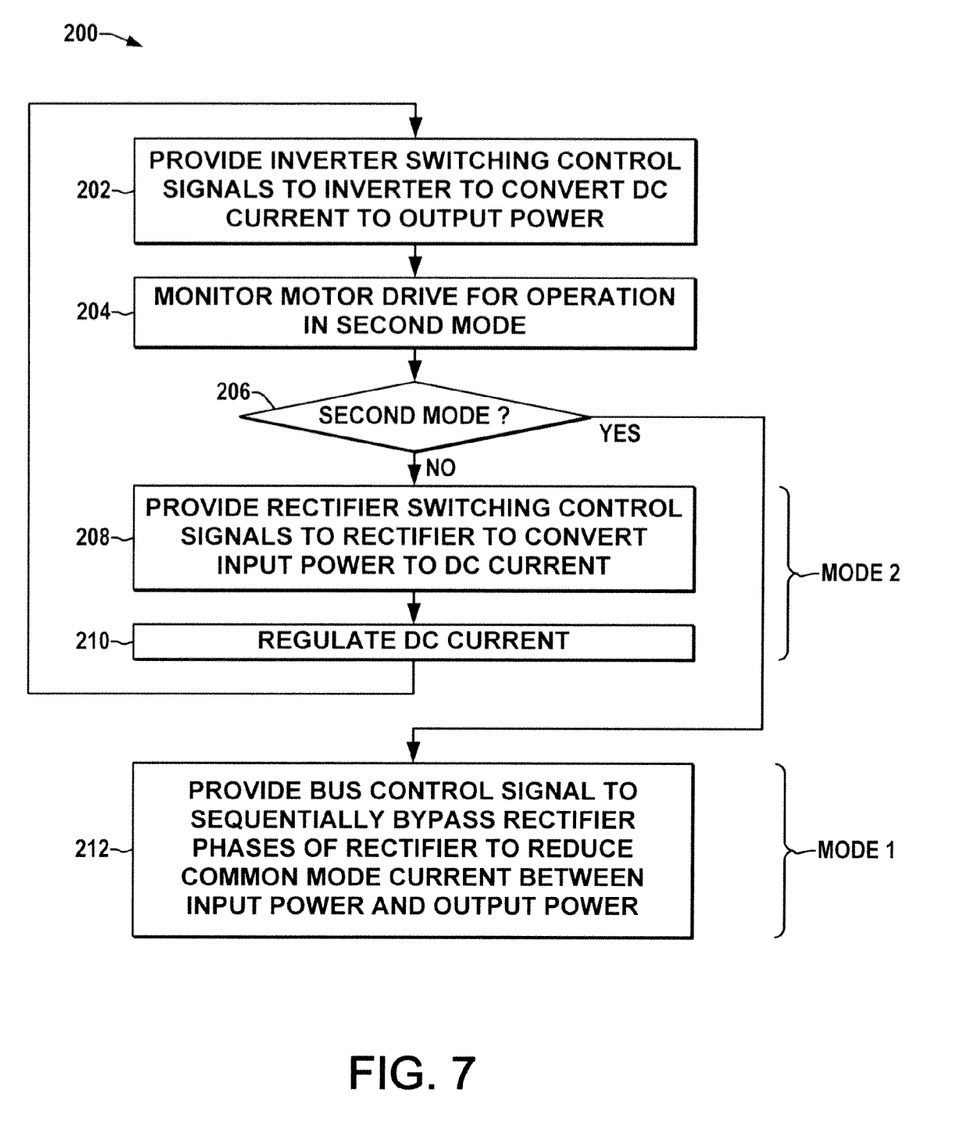
FIGS. 7-9 are flow diagrams illustrating exemplary methods for operating a CSC motor drive in accordance with various aspects of the disclosure.

FIG. 7 is a flow diagram illustrating an exemplary method 200 for operating a power conversion system in accordance with further aspects of the disclosure. While the method 200 is illustrated and described below in the form of a series of acts or events, it will be appreciated that the various methods of the disclosure are not limited by the illustrated ordering of such acts or events, and that except as specifically provided hereinafter, some acts or events may occur in different order and/or concurrently with other acts or events apart from those illustrated and described herein. In addition, not all illustrated steps may be required to implement a process or method in accordance with the present disclosure, and one or more such acts may be combined. The illustrated methods may be implemented in hardware, processor-executed software, programmable logic, etc., or combinations thereof, in order to provide the motor drive control and protective circuit functionality described herein, and may be employed in any current source converter-based motor drive such as in the switching control system 140, 140' of the exemplary drives shown and described above, wherein the disclosure is not limited to the specifically illustrated and described applications and embodiments.

The process 200 begins at 202 with the operation of the drive circuit inverter control component 144b providing inverter switching control signals 142b to the inverter 110b to convert the regulated DC current to provide AC electrical power to the AC output 114 according to at least one setpoint 141 in a normal mode of operation. At 204, the feedback system 118 monitors the drive 110 by sensing and/or otherwise determining the conditions of one or more components of the drive 110 including lines coupling inputs and outputs, for example, of the rectifier 110a, the intermediate DC circuit 150, the inverter 110b, etc. A determination is made at 206 as to whether the sensed motor condition(s) indicates a transient condition, for example, when a detected or sensed change in steady state conditions on the lines occur. If so (YES at 206), the process proceeds to 212. If the motor conditions do not indicate a second (protective) mode situation (NO at 206), the controller 140 proceeds in a first (normal) operational mode with the rectifier controller 144a providing rectifier switching control signals 142a to the active rectifier 110a at 208 to convert AC electrical input power to provide a DC current Idc to the intermediate and to regulate (at 210) the current Idc according to a desired DC current value Idc* representing the requirements of the inverter 110b. The process continues at 202 and 204 where the inverter control component 144b provides inverter switching control signals 142b to the inverter 110b to convert the regulated DC current to provide AC electrical power to the AC output 114 according to at least one setpoint 141, after which the process returns to 204 to continue monitoring the motor condition(s) for detecting transient conditions. Once a transient condition is determined (YES at 206), the process 200 proceeds in a second operational mode (protection mode) at 212 where bus control signals are provided to a rectifier control component 144a to sequentially bypass rectifier phases 121, 123, 125 of rectifier 110a to reduce a common mode current and/or voltage between input power and output power at terminals of the drive 110.

Figure 8:
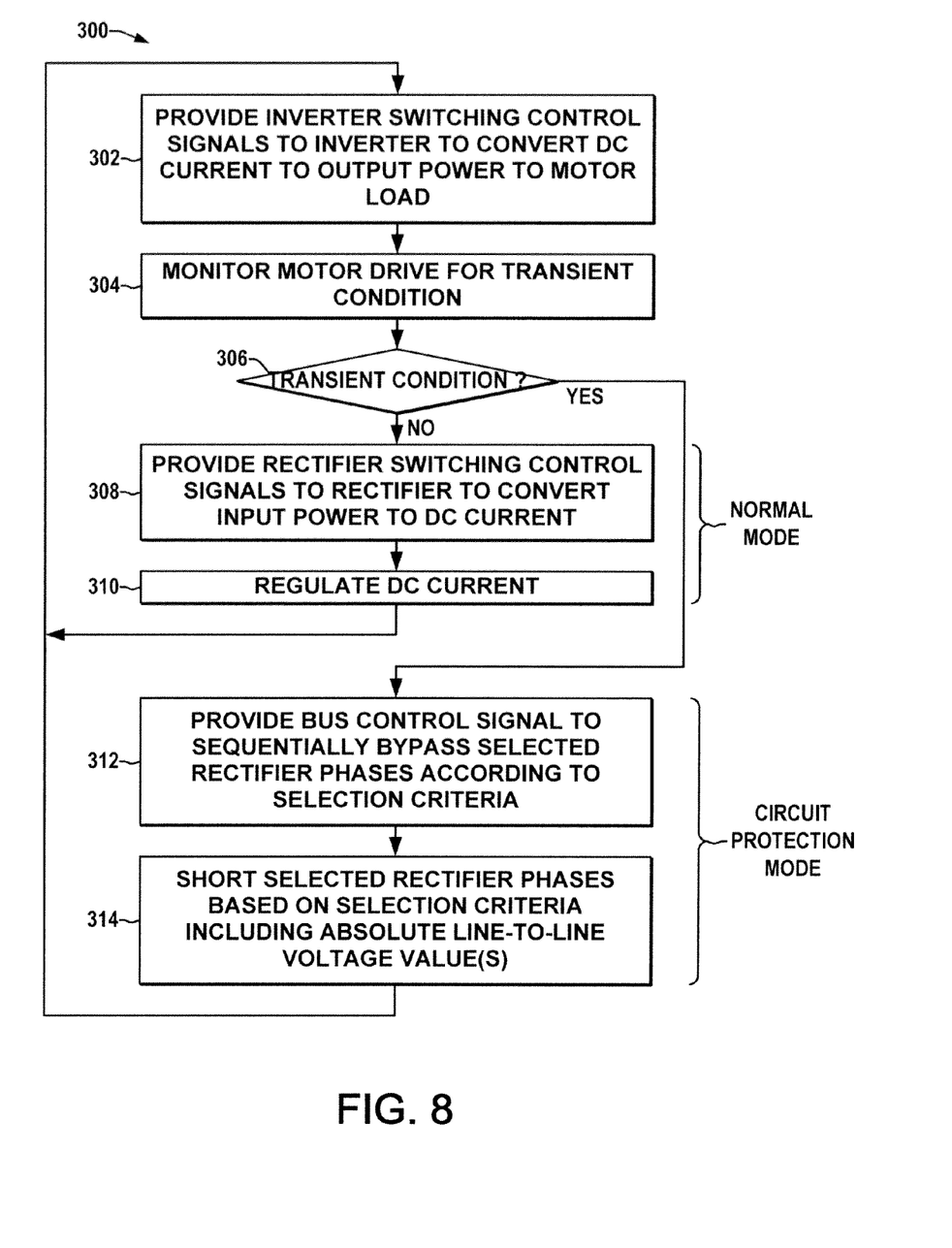

According to one embodiment illustrated in FIG. 8, a process flow or method 300 begins with inverter switching control signals being provided to convert DC current to output power to a motor load as discussed above in the current source motor drive circuit 110. The drive is monitored at 304 for transient conditions at 304, and a determination is made at 306 as to whether a transient condition is occurring. Once a protection mode is determined (YES at 306), the process flow continues at 312 and 314 as discussed below. Otherwise (NO at 306), the process 200 under a normal operation mode to provide rectifier switching control signals to the rectifier 110a to convert input power that is AC input current to DC current, with the DC current being regulated according to desired setpoints at 310 and the process repeats at 302 and 304 discussed above.

Once a transient condition is determined (YES at 306), the process continues to a second operational mode (circuit protection mode) at 312 with the bus transient control component 144c providing bus control signals in the switching control to sequentially bypass a selected rectifier phase 121, 123, or 125 according to selection criteria at any given time. At least one selection criteria is at least partially used to select the rectifier phase to short at 314. The selection criteria includes an absolute line-to-line voltage value (e.g., Vab, Vac, Vbc) in order to determine the phase at any given time that is shorted until the transient condition ceases. In certain embodiments, this involves selecting the phase that is not associated with a maximum absolute line-to-line input voltage. The process 200 then continues to monitor the drive for a transient condition or a change in steady state at 304.

Figure 9:
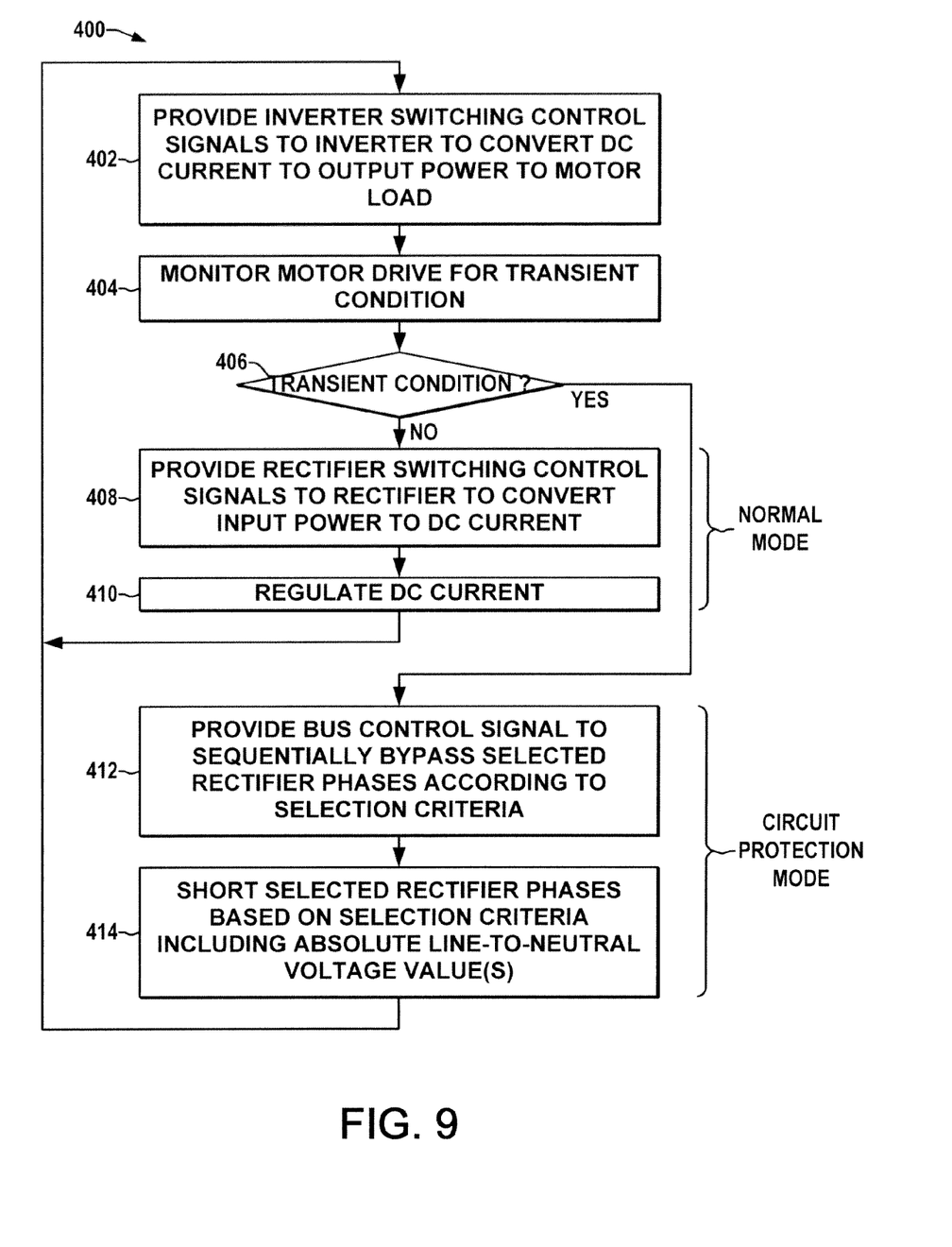

Another embodiment is shown in FIG. 9, in which a bypass phase is selected in the second mode which corresponds to the lowest absolute line-to-neutral voltage value. The process 400 begins at 402 (similar to 202 and 302 described above in connection with FIGS. 7 and 8). At 404, the motor drive is monitored for transient conditions and a determination is made at 406 as to whether transients are occurring. If not (NO at 406), the drive operates in normal mode with rectifier switching signals provided to the rectifier 110a to convert inputted power to an outputted power according to a setpoint and at 410 the DC current is regulated. Otherwise (YES at 406), the process 400 proceeds to 412 to provide bus control signals to sequentially bypass selected rectifier phases according to selection criteria. At 414, selected rectifier phases are shorted based on selection criteria that includes an absolute line-to-neutral voltage. For example, a rectifier phase associated with the lowest absolute line-to-neutral input voltage during the protective mode of operation becomes the selected phase shorted at any given time. The rectifier phases are therefore shorted independently and separate from one another in a sequential pattern in order to reduce the common mode voltage of the drive. In other embodiments, more than one phase may be shorted while the phase or phases are opened.

In accordance with further aspects of the present disclosure, a non-transitory computer readable medium is provided, such as a computer memory, a memory within a power converter control system (e.g., switch control system 140 above), a CD-ROM, floppy disk, flash drive, database, server, computer, etc. which has computer executable instructions for performing the processes described above.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A power conversion system, comprising:
an active rectifier comprising an AC input having a plurality of AC input nodes to receive AC electrical input power, a DC output having first and second DC output nodes, and a rectifier switching network comprising a plurality of rectifier switching devices that form a plurality of rectifier phase individually coupled between one of the AC input nodes and one of the first and second DC output nodes, the rectifier switching devices individually operable to selectively couple the AC input node with the corresponding DC output node according to a corresponding rectifier switching control signal;
an inverter comprising an AC output having a plurality of AC output nodes for supplying AC electrical power to a load, and an inverter switching network comprising a plurality of inverter switching devices individually coupled between one of a pair of DC current paths and one of the AC output nodes, the inverter switching devices individually operable to selectively electrically couple the corresponding DC current path with the corresponding AC output node according to a corresponding inverter switching control signal;
a switch control system selectively operable in a first mode for normal operation and in a second mode for circuit protection during transient bus conditions, the switch control system comprising:
an inverter control component operative to provide the inverter switching control signals in the first and second modes to cause the inverter to selectively convert DC current to provide AC electrical power to the AC output according to at least one setpoint for the load,
a rectifier control component operative to provide the rectifier switching control signals in the first mode to convert AC electrical input power to provide a regulated DC current according to a desired DC current value representing the requirements of the inverter, and
a bus transient control component operative in the second mode to provide at least one bus transient control signal or value to cause the rectifier
control component to selectively bypass a selected phase of the rectifier, the selected phase being selected based at least partially on at least one selection criteria to reduce common mode voltage or current associated with the drive while opening switching devices associated with the other phases.

2. The system of claim 1, wherein the bus transient control component is operative to selectively bypass the selected phase at different times by shorting the rectifier switching devices of the selected phase based on the selection criteria.

3. The system of claim 2, wherein the selected phase is chosen as the rectifier phase at any given time associated with the AC input node having an absolute line-to-neutral voltage value closest to zero.

4. The system of claim 2, wherein the bus transient control component is operative to determine the selected phase at any given time based at least partially on absolute voltage values at the AC input nodes.

5. The system of claim 4, wherein the selected rectifier phase is chosen as the rectifier phase at any given time not associated with AC input nodes having the highest absolute line-to-line voltage value.

6. The system of claim 1, further comprising:
a feedback circuit providing at least one feedback signal or value based on a sensed condition of at least one of the rectifier and the inverter; and
a mode control component operative to set the switch control system to either
the first or the second mode according to the at least one feedback signal or value from the feedback circuit.

7. The system of claim 6, wherein the mode control component is operative to set the switch control system to the second mode when a detected or sensed distortion of steady state condition is present at the AC input and/or AC output.

8. The system of claim 7, wherein the bus transient control component is operative to detect the second mode of operation and in response send the at least one bus transient control signal to the rectifier control component.

9. The system of claim 1, wherein the bus transient control component bypasses the rectifier phases in a sequential pattern by shorting the selected phase and changing the selected phase that is shorted to another selected phase until no transient condition is detected on the AC input nodes of the rectifier.

10. The system of claim 1, comprising a circuit path coupled to the AC input and the AC output for a current flow therebetween, wherein the bus transient control component reduces common mode voltage measured across the circuit path during the second mode of operation by controlling an operational absolute voltage value across the circuit path to less than 300 volts for the circuit protection.

11. The system of claim 1, wherein the power conversion system is a current source converter drive that drives a motor load connected to the AC output to receive the AC electrical power during the first mode of operation and the second mode of operation, and includes a DC circuit comprising a DC link inductor with first and second windings coupled in corresponding first and second DC current paths.

12. A method for operating a power conversion system, the method comprising:
    providing inverter switching control signals to the inverter to convert DC current to provide AC electrical power to an AC output coupled to a load according to at least one setpoint;
    in a first operational mode of the power conversion system, providing rectifier switching control signals to an active rectifier to convert AC electrical input power at an AC input to provide a DC current;
    monitoring the power conversion system for a transient condition; and
    upon detecting a transient condition, operating in a second operational mode of the power conversion system that comprises bypassing a selected rectifier phase of a plurality of phases having switching devices coupled to the AC input to reduce a common mode current between the AC input and the AC output.

13. The method of claim 12, comprising shorting the rectifier phases in a sequential pattern.

14. The method of claim 13, wherein bypassing a selected rectifier phase, comprises:
    shorting a first rectifier phase at a first time while opening other rectifier phases;
    shorting a second rectifier phase of the rectifier phases at a second time while opening other rectifier phases; and
    shorting a third rectifier phase at a third time while opening other rectifier phases.

15. The method of claim 12, comprising bypassing the selected rectifier phase based on an absolute voltage value by shorting the selected rectifier phase not associated with AC input nodes having the highest absolute line-to-line voltage value while opening other rectifier phases.

16. The method of claim 12, comprising bypassing the selected rectifier phase based on an absolute voltage value by shorting the selected rectifier phase having a minimum absolute line-to-neutral voltage value while opening other rectifier phases.

17. The method of claim 12, comprising:
    sensing the transient condition of at least one of the rectifier, an intermediate DC circuit, and the inverter; and
    setting the operational mode of the motor drive to the second mode according to the sensed transient condition.

18. A non-transitory computer readable medium comprising computer executable instructions for operating a power conversion system comprising:
    providing inverter switching control signals to the inverter to convert DC current to provide AC electrical power to an AC output coupled to a load according to at least one setpoint;
    in a first operational mode of the power conversion system providing rectifier switching control signals to an active rectifier to convert AC electrical input power at an AC input to provide a DC current;
    monitoring the power conversion system for a transient condition; and
    upon detecting a transient condition, operating in a second operational mode comprising bypassing a selected rectifier phase to reduce a common mode current between the AC input and the AC output.

19. A power conversion system, comprising:
    a multi-phase AC input including a plurality of AC input terminals for receiving multi-phase AC electrical input power;
    a multi-phase AC output having a plurality of AC output terminals for providing multi-phase AC electrical output power;
    a switching network including a plurality of switching devices forming a plurality of phase circuits individually associated with a corresponding one of the AC input terminals, the switching devices operative according to a switching control signal, each phase circuit being connected to a corresponding AC input terminal and to a corresponding AC output terminal, and each phase circuit comprising at least one switching device coupled between the corresponding AC input terminal and the corresponding AC output terminal; and
    a switch control system operative to provide switching control signals to cause the switching network to selectively convert the AC electrical input power from the multi-phase AC input to provide the multi-phase AC electrical output power to the a multi-phase AC output according to at least one setpoint signal or value, the switch control system being operative in a first mode to control normal operation of the switching network and in a second mode for protection of the switching network during a transient condition, the switch control system comprising:
        a transient control component that provides at least one transient bypass signal to cause the switching network to short a selected phase circuit of the switching network based on at least one selection criteria during operation in the second mode while opening at least one switching device associated with the other phase circuits.

20. The system of claim 19, wherein the transient control component is configured to short the phase circuits in a sequential pattern so that the selected phase circuit being shorted is changed to another selected phase circuit at different times during operation in the second mode according to the selection criteria.

21. The system of claim 19, wherein the power conversion system is an AC to AC matrix converter that drives a motor load connected to the multi-phase AC output to receive the multi-phase AC electrical output power during the first mode of operation and the second mode of operation.

22. The system of claim 19, wherein the power conversion system is a current source converter drive that drives a motor load connected to the multi-phase AC output to receive the multi-phase AC electrical output power during the first mode of operation and the second mode of operation, and includes a rectifier and an inverter coupled to the motor load.

23. The system of claim 19, wherein the selected phase circuit is chosen as the phase associated with an AC input node having a minimum absolute line-to-neutral voltage value at any given time during operation in the second mode.

24. The system of claim 19, wherein the selected phase circuit is chosen as the phase not associated with AC input nodes having the highest absolute line-to-line voltage value at any given time during operation in the second mode.

* * * * *